United States Patent [19]
Somers

[11] Patent Number: 5,115,364
[45] Date of Patent: May 19, 1992

[54] THIN-FILM MAGNETIC HEAD HAVING TWO MAGNETO-RESISTANT ELEMENTS

[75] Inventor: Gerardus H. J. Somers, Eindhoven, Netherlands

[73] Assignee: U.S. Philips Corporation, New York, N.Y.

[21] Appl. No.: 599,329

[22] Filed: Oct. 17, 1990

[30] Foreign Application Priority Data

Oct. 17, 1989 [NL] Netherlands ............ 8902570

[51] Int. Cl.⁵ .......... G11B 5/127; G11B 5/33; G11B 5/147
[52] U.S. Cl. ................... 360/113; 360/126
[58] Field of Search ................ 360/113, 126

[56] References Cited

U.S. PATENT DOCUMENTS 4,729,048  3/1988  Imakoshi .................. 360/103

Primary Examiner—A. J. Heinz
Attorney, Agent, or Firm—John C. Fox

[57] ABSTRACT

A thin-film magnetic head comprises a magnetic yoke, having a first and a second flux conductor (1, 2) and a magneto-resistance element (4) remote from a head face (7). A first edge portion (4a) of the magneto-resistance element (4) is located closer to the head face (7) than a second edge portion (4b). The first flux condutor (1) extends from the head face (7) to close to the first edge portion (4a) and the second flux conductor (2) extends from the head face at least to the second edge portion (4b). Furthermore, the magnetic head includes a further magneto-resistance element (5) which forms part of the magnetic yoke and is located between the first and the second flux conductors (1, 2) at the head face (7).

4 Claims, 1 Drawing Sheet

5,115,364

THIN-FILM MAGNETIC HEAD HAVING TWO MAGNETO-RESISTANT ELEMENTS

BACKGROUND OF THE INVENTION

1. Field of the Invention

The invention relates to a thin-film magnetic head having a head face for cooperation with an information carrier, which thin-film magnetic head comprises a magnetic yoke having a first and a second flux conductor contiguous to the head face and a magneto-resistance element remote from the head face, a first edge portion of which is closer to the head face than a second edge portion and has an axis of easy magnetization extending parallel to the head face and which magneto-resistance element extends in a direction perpendicular to the head face, the first flux conductor extending at least to the second edge portion and the second flux conductor extending to at least roughly the first edge portion and the thin-film magnetic head comprising a further magneto-resistance element having an axis of easy magnetization extending parallel to the head face.

2. Description of the Related Art

A magnetic head of the type referred to above is a yoke magneto-resistance head and is extremely suitable for reading long-wave signals of analog information from a track of a magnetic information carrier. In addition to the magnetic head defined in the opening paragraph, shielded magneto-resistance heads are also known, wherein a magneto-resistance element is located at the head face between two flux conductors. Such a magnetic head is extremely suitable for reading short-wave signals representing digital information from a track of a magnetic information carrier.

The thin-film magnetic head defined in the opening paragraph is disclosed in the U.S. Pat. No. 4,729,048. This known magnetic head comprises a shielded magneto-resistance head in addition to a yoke magneto-resistance element.

This known magnetic head has the disadvantage that it must be provided with two transducing gaps to be able to read both short-wave and long-wave signals from tracks of a magnetic information carrier.

SUMMARY OF THE INVENTION

The invention has inter alia for its object to provide a simplified structure of a magnetic head, suitable for reading information having both short- and long-wave lengths.

To that end, the invention is characterized, in that the further magneto-resistance element forms part of the magnetic yoke and is located between the first and second flux conductors at the head face. This provides a magnetic head having one transducing gap and a structure having both a yoke and a shielded magneto-resistance head, so that with one transducing gap signals having both short- and long-wave lengths can be read optimally.

JP-A-63-220409 discloses a yoke magneto-resistance magnetic head having two magneto-resistance elements for reading long-wave and short-wave signals. This construction has the disadvantage that the magneto-resistance element located near the head face and intended to read short-wave signals is located remote from the head face. Consequently, the element is not so suitable for reading signals having very short wavelengths.

JP-A-56-65329 discloses a magneto-resistance magnetic head for reading long-wave and short-wave signals. This construction has the disadvantage that for the reading of long-wave signals the magnetic flux cannot be passed on to the element remote from the head face, so that long-wave signals cannot be read equally well as in the case of a yoke magneto-resistance head.

The structure according to the invention has the advantage that signals of both long and short wavelengths can be read optimally.

An embodiment of the thin-film magnetic head according to the invention, is characterized in that the magneto-resistance element and the further magneto-resistance element have each one end interconnected via an electrically conducting connection track, which end coincides with an end of the axis of easy magnetization, and are each connected by means of their other end, which coincides with an other end of the axis of easy magnetization, to electrically conducting connection tracks. By not connecting the magneto-resistance elements individually but by arranging them in series, two electrically conducting connection tracks are saved and furthermore a larger resistance change is measured than in the case where reading is only effected with one of the two magneto-resistance elements. Also the electronic circuit for reading and controlling the magneto-resistance elements can in this case be of a simpler structure than when the magneto-resistance elements are connected individually. Such a connection of two magneto-resistance elements in a yoke magneto-resistance head is disclosed in the Japanese Patent Application JP-A-63-69016.

A further embodiment of the thin-film magnetic head according to the invention, is characterized, in that a bias winding extends close to and parallel to at least one of the magneto-resistance heads. By energizing the bias winding it is possible to have the magneto-resistance elements function in their linear measuring range whereby non-linearities may be avoided.

BRIEF DESCRIPTION OF THE DRAWINGS

The invention will now be described in greater detail by way of example with reference to embodiments of a thin-film magnetic head according to the invention shown in the accompanying Figures.

Therein.

DETAILED DESCRIPTION OF THE PREFERRED EMBODIMENTS

Figure 1:
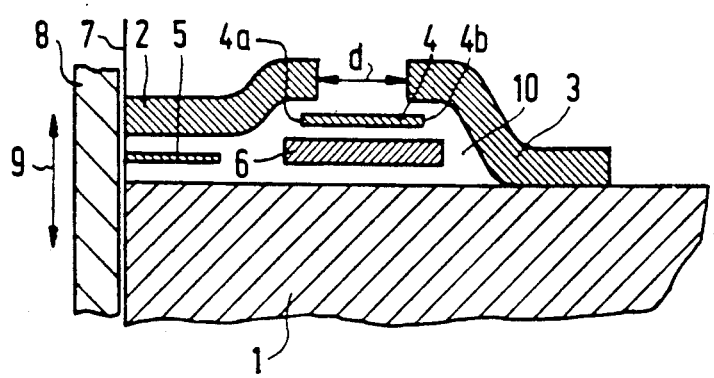
FIG. 1 is a cross-sectional view of a thin-film magnetic head according to the invention.

FIG. 1 is a cross-sectional view of an embodiment of the thin-film magnetic head according to the invention. This magnetic head is provided with a head face 7 for cooperation with an information carrier 8 which is movable in the direction of the double arrow 9. The magnetic head includes a substrate 1 of a magnetic material forming a first flux conductor contiguous to the head face 7. Instead of a magnetic substrate it is alternatively possible to start from a non-magnetic substrate on which a magnetic layer is deposited which then functions as the flux conductor. Furthermore, the magnetic head includes a second flux conductor 2 contiguous to the head face and a magneto-resistance element 4. The first and second flux conductors 1, 2 and the magneto-resistance element 4 form part of a magnetic yoke. The second flux conductor 2 extends to a first edge portion 4a of the magneto-resistance element 4 and the substrate 1 extends to beyond a second edge portion 4b of the magneto-resistance element 4. The magnetic head further includes a third flux conductor 3, located at a distance d behind the second flux conductor 2 when seen from the head face 7. This third flux conductor 3 is not essential for the mode of operation of the magnetic head and may optionally be omitted. The distance d between the second and third flux conductors 2, 3 is magnetically bridged by the magneto-resistance element 4. It is alternatively possible to provide this magneto-resistance element 4 on the sides of the second and the third flux conductors facing away from the substrate. A further magneto-resistance element 5 which is contiguous to the head face 7, is present between the first and the second flux conductors 1 and 2. A bias winding 6 for premagnetization of the magneto-resistance element 4 is located between the magneto-resistance element 4 and the substrate 1. Such a conductor can alternatively be deposited between the further magneto-resistance element 5 and the substrate 1. The magneto-resistance elements, flux conductors and the electrical conductor are insulated from each other by insulating material 10.

Figure 2:
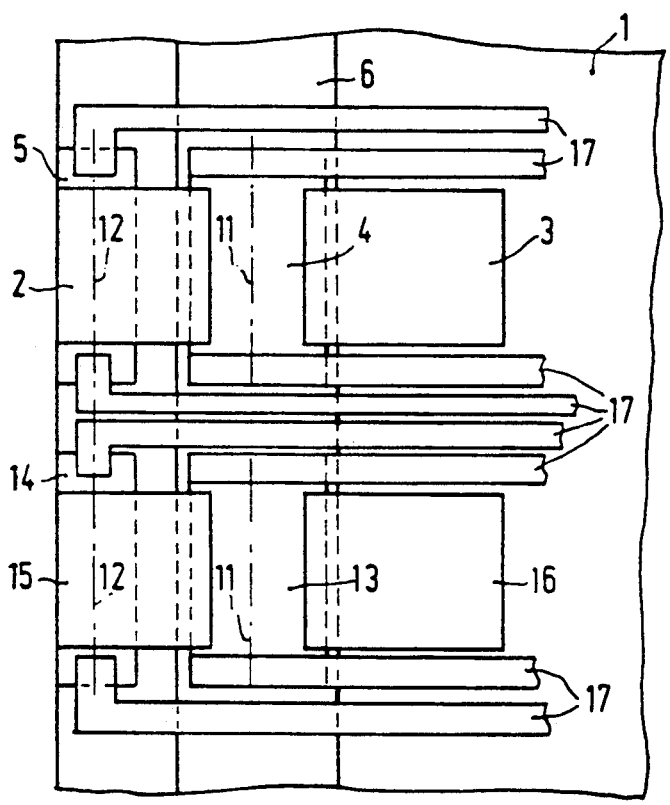
FIG. 2 is a lay-out of a first variant of the thin-film magnetic head shown in FIG. 1.

FIG. 2 is a lay-out of a first variation of a pair of the above-described thin-film magnetic heads in accordance with the invention, provided with a plurality of transducing gaps. The axes of easy magnetization 11, 12 of the magneto-resistance elements 4, 5, 13, 14 extend parallel to the head face 7. The pairs of magneto-resistance elements 4, 5 and 13, 14, located between the flux conductors 2, 3, 15, 16 and the substrate 1, are connected to electrically conducting connection tracks 17. Thus, each magneto-resistance element can be individually connected. The continuous bias winding 6 is located between the magneto-resistance elements 4 and 13 and the substrate 1.

Figure 3:
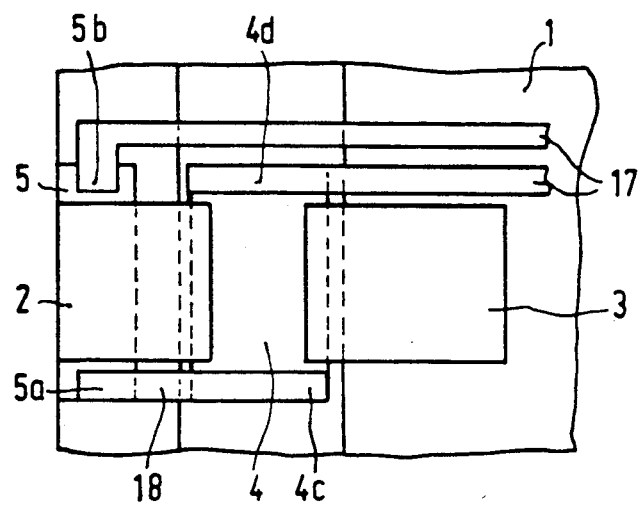
FIG. 3 is a lay-out of a second variant of the thin-film magnetic head with series-arranged magneto-resistance elements, shown in FIG. 1.

FIG. 3 is a lay-out of a second variation of the thin-film magnetic head according to the invention, wherein the magneto-resistance elements 4 and 5, located between the second and the third flux conductors 2 and 3 and the substrate 1 are electrically interconnected via an electrically conducting connection track 18 at one end 4c, 5a and are connected at their other end 4d, 5b to electrically conducting connection tracks 17. Thus, the magneto-resistance elements 4 and 5 are arranged in series and voltage fluctuations due to the changes in resistance of the magneto-resistance elements are added together, so that a larger output is possible.

It will be obvious that the invention is not limited to the embodiments described in the foregoing. Barber poles may be deposited on the magneto-resistance elements to enlarge the linear operating range and the bias winding may optionally be omitted. A magneto-resistance element having a Barber pole is described in the U.S. Pat. No. 4,052,748.

I claim:

1. A thin-film magnetic head having a head face for cooperation with an information carrier, which thin-film magnetic head comprises a magnetic yoke having a first and a second flux conductor contiguous to the head face and a magneto-resistance element remote from the head face, a first edge portion of which is closer to the head face than a second edge portion and has an axis of easy magnetization extending parallel to the head face and which magneto-resistance element has a longitudinal axis which extends in a direction parallel to the head face, the first flux conductor extending at least to the second edge portion and the second flux conductor extending to at least roughly the first edge portion and the thin-film magnetic head comprising a further magneto-resistance element having an axis of easy magnetization parallel to the head face, characterized in that the further magneto-resistance element is located between the first and second flux conductors at the head face and magnetically cooperates with the first and second flux conductors during operation.

2. A thin-film magnetic head as claimed in claim 1, characterized in that the magneto-resistance element and the further magneto-resistance element have each one end interconnected via an electrically conducting connection track, which end coincides with an end of the axis of easy magnetization, and are each connected by means of their other end, which coincides with an other end of the axis of easy magnetization, to electrically conducting connection tracks.

3. A thin-film magnetic head as claimed in claim 2, characterized in that a bias winding extends near to and parallel to at least one of the magneto-resistance elements.

4. A thin-film magnetic head as claimed in claim 1 characterized in that a bias winding extends near to and parallel to at least one of the magneto-resistance elements.

* * * * *